United States Patent
Takemura

(10) Patent No.: US 10,591,841 B2
(45) Date of Patent: Mar. 17, 2020

(54) IMAGE FORMING APPARATUS FOR CONTROLLING TO MAKE THE DOT SIZE OF THE HIGHLIGHT PART DIFFERENT DEPENDING ON THE TYPE OF RECORDING MATERIAL, AND METHOD OF CONTROLLING THE SAME, AND STORAGE MEDIUM

(71) Applicant: CANON KABUSHIKI KAISHA, Tokyo (JP)

(72) Inventor: Taichi Takemura, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/007,066

(22) Filed: Jun. 13, 2018

(65) Prior Publication Data
US 2018/0373180 A1 Dec. 27, 2018

(30) Foreign Application Priority Data
Jun. 23, 2017 (JP) .................. 2017-123566

(51) Int. Cl.
| | | |
|---|---|---|
| G03G 15/00 | (2006.01) | |
| G06K 15/00 | (2006.01) | |
| H04N 1/00 | (2006.01) | |
| G03G 15/04 | (2006.01) | |
| G03G 15/01 | (2006.01) | |
| G03G 15/32 | (2006.01) | |
| H04N 1/405 | (2006.01) | |
| G06K 15/02 | (2006.01) | |

(52) U.S. Cl.
CPC ... *G03G 15/04027* (2013.01); *G03G 15/0115* (2013.01); *G03G 15/326* (2013.01); *G03G 15/5029* (2013.01); *G06K 15/1881* (2013.01); *H04N 1/4055* (2013.01)

(58) Field of Classification Search
CPC ........... G03G 15/04027; G03G 15/043; G03G 15/32; G03G 15/5029; G03G 15/326; G03G 15/0115; G06K 15/1881; H04N 1/405; H04N 1/4055; H04N 1/4057
USPC ........ 399/4, 45, 51, 180, 181; 347/131, 240, 347/251, 252, 254; 358/3.06, 3.1, 3.12
See application file for complete search history.

(56) References Cited

U.S. PATENT DOCUMENTS 8,406,671 B2 * 3/2013 Tanaka ..................... H04N 1/52
399/336
8,467,101 B2 * 6/2013 Sugiyama .......... G03G 15/5058
347/131

(Continued)

FOREIGN PATENT DOCUMENTS

| JP | H08305005 A | 11/1996 |
|---|---|---|
| JP | 2003186260 A * | 7/2003 |
| JP | 2007062308 A * | 3/2007 |

*Primary Examiner* — Robert B Beatty
(74) *Attorney, Agent, or Firm* — Carter, DeLuca & Farrell LLP

(57) ABSTRACT

An image forming apparatus, for performing image forming by transferring and fixing an image formed on an image carrier to a printing material, that selects a smallest dot size of a halftone dot pattern representing a halftone of a highlight region corresponding to a type of the printing material, and uses a screen representing the selected smallest dot size to perform exposure control of the image carrier.

16 Claims, 14 Drawing Sheets

(56) References Cited

U.S. PATENT DOCUMENTS

| | | | | |
|---|---|---|---|---|
| 2010/0046035 A1* | 2/2010 | Kinoshita | ............ | H04N 1/405 |
| | | | | 358/3.06 |
| 2010/0214618 A1* | 8/2010 | Maehira | ............... | B41J 29/393 |
| | | | | 358/3.12 |
| 2017/0087869 A1* | 3/2017 | Suzuki | ................. | B41J 2/2103 |
| 2018/0373472 A1* | 12/2018 | Itoh | ................. | G06K 15/1881 |

* cited by examiner

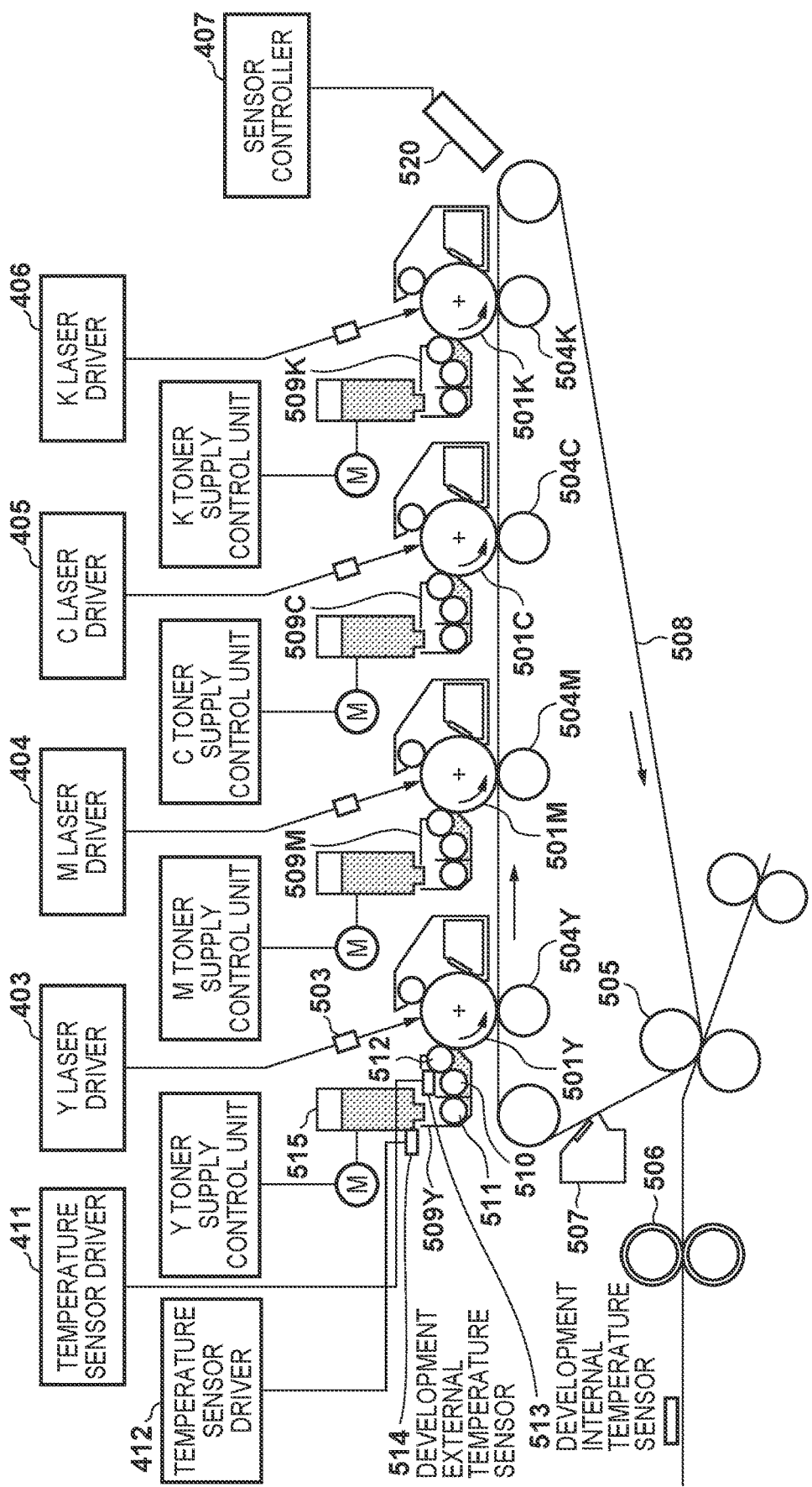

FIG. 6A
FIG. 6B
FIG. 6C
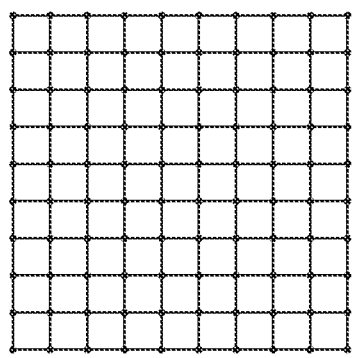
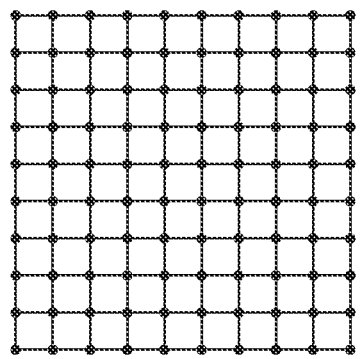
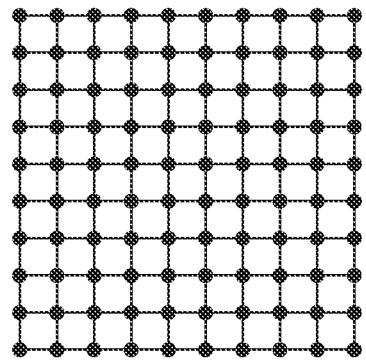
FIG. 7
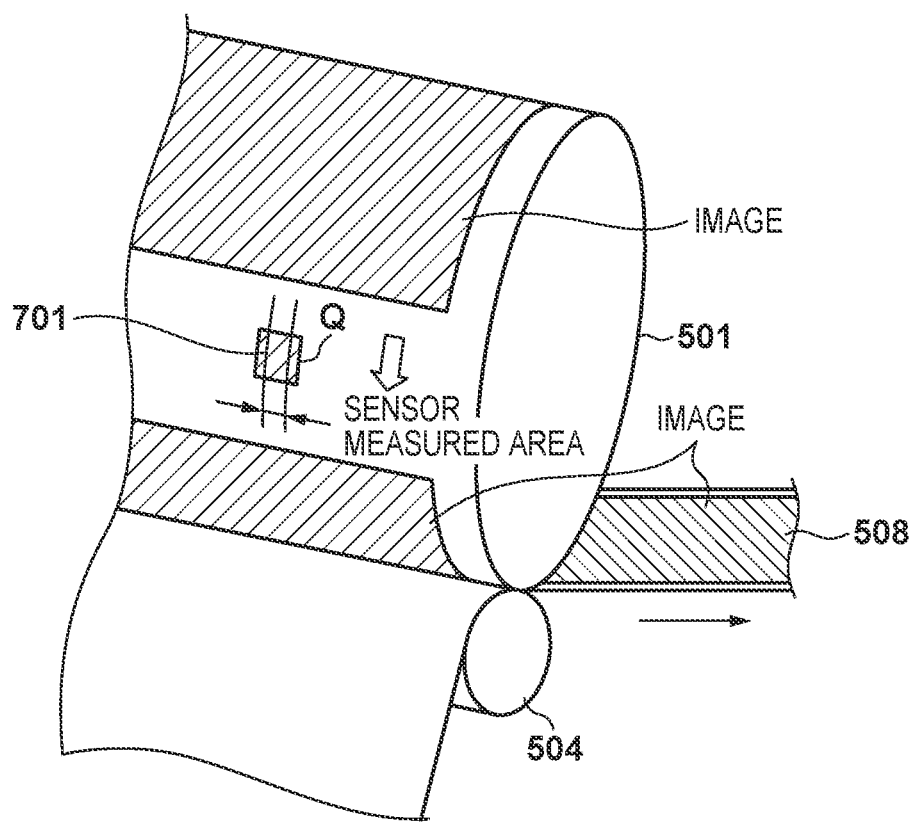

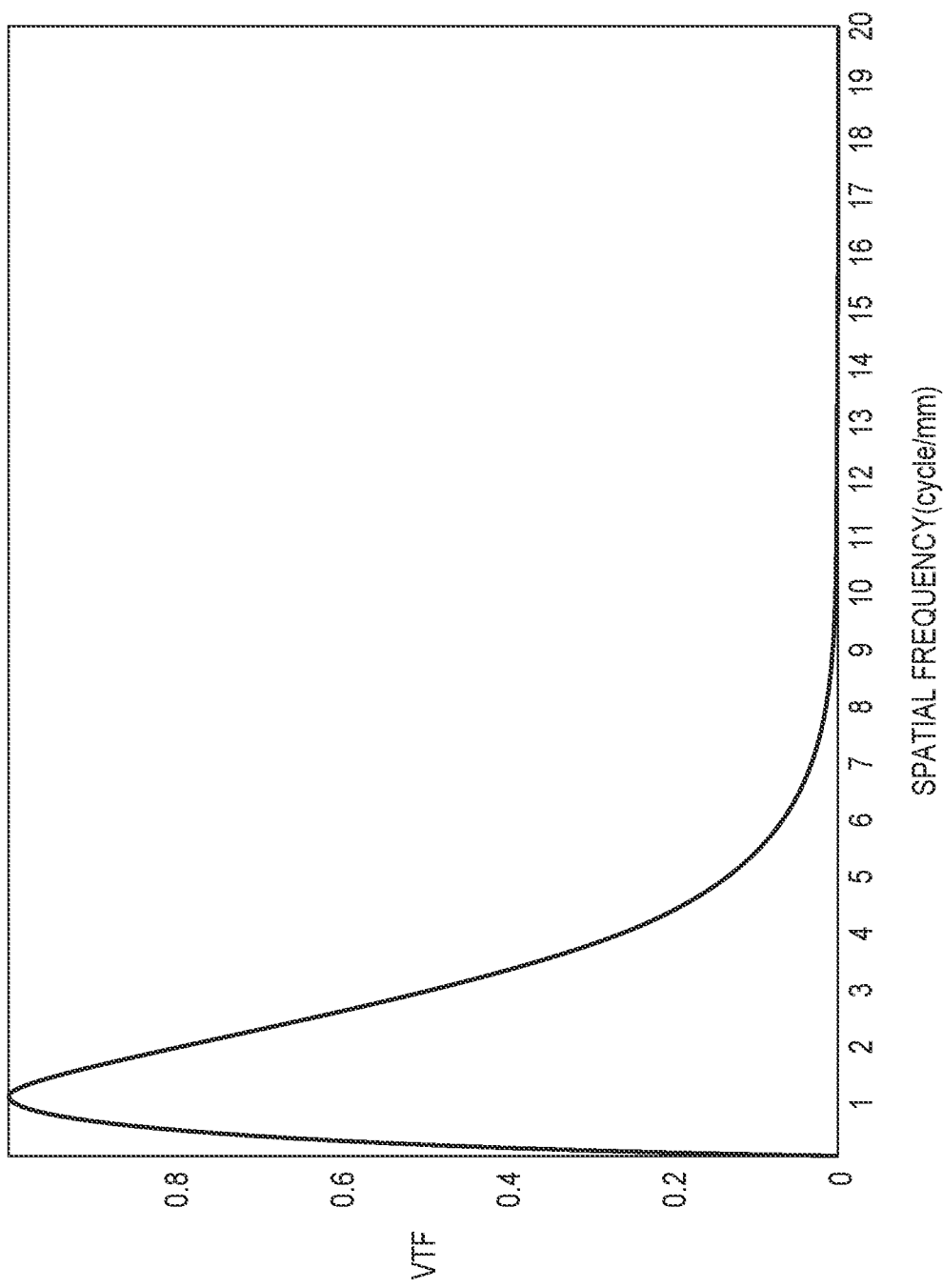

FIG. 13
SCREEN A
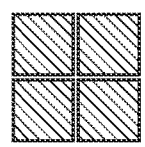
SCREEN B
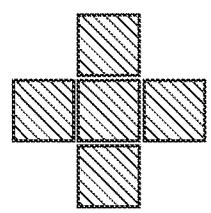
SCREEN C
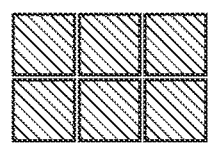
SCREEN D
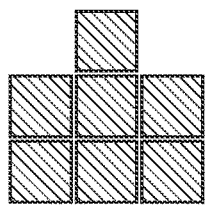
SCREEN E
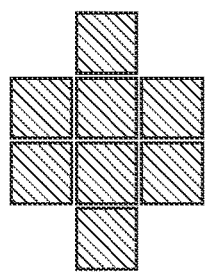
SCREEN F
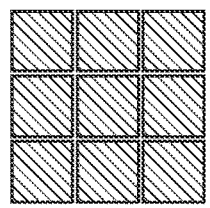
SCREEN G
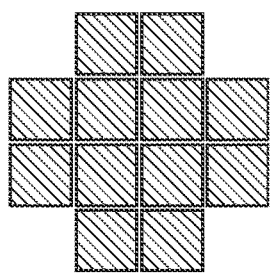
SCREEN H
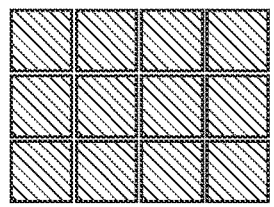
SCREEN I
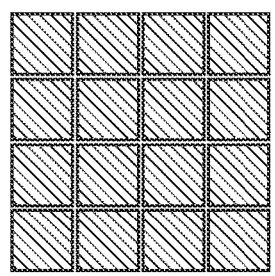
SCREEN J

FIG. 14A

| PLAIN PAPER | DOT SIZE | DOT REPRODUCIBILITY | LIKELIHOOD FOR DOT TO NOT BE CONSPICUOUS |
|---|---|---|---|
| SCREEN A | 1 | × | ○ |
| SCREEN B | 4 | × | ○ |
| SCREEN C | 5 | × | ○ |
| SCREEN D | 6 | × | ○ |
| SCREEN E | 7 | × | ○ |
| SCREEN F | 8 | ○ | ○ |
| SCREEN G | 9 | ○ | ○ |
| SCREEN H | 12 | ○ | × |
| SCREEN I | 12 | ○ | × |
| SCREEN J | 16 | ○ | × |

FIG. 14B

| COATED PAPER | DOT SIZE | DOT REPRODUCIBILITY | LIKELIHOOD FOR DOT TO NOT BE CONSPICUOUS |
|---|---|---|---|
| SCREEN A | 1 | × | ○ |
| SCREEN B | 4 | × | ○ |
| SCREEN C | 5 | ○ | ○ |
| SCREEN D | 6 | ○ | ○ |
| SCREEN E | 7 | ○ | × |
| SCREEN F | 8 | ○ | × |
| SCREEN G | 9 | ○ | × |
| SCREEN H | 12 | ○ | × |
| SCREEN I | 12 | ○ | × |
| SCREEN J | 16 | ○ | × |

F I G. 15A

| PLAIN PAPER | DOT SIZE | DOT REPRODUCIBILITY | LIKELIHOOD FOR DOT TO NOT BE CONSPICUOUS |
|---|---|---|---|
| SCREEN A | 1 | × | ○ |
| SCREEN B | 4 | × | ○ |
| SCREEN C | 5 | × | ○ |
| SCREEN D | 6 | × | ○ |
| SCREEN E | 7 | ○ | ○ |
| SCREEN F | 8 | ○ | ○ |
| SCREEN G | 9 | ○ | × |
| SCREEN H | 12 | ○ | × |
| SCREEN I | 12 | ○ | × |
| SCREEN J | 16 | ○ | × |

F I G. 15B

| COATED PAPER | DOT SIZE | DOT REPRODUCIBILITY | LIKELIHOOD FOR DOT TO NOT BE CONSPICUOUS |
|---|---|---|---|
| SCREEN A | 1 | × | ○ |
| SCREEN B | 4 | ○ | ○ |
| SCREEN C | 5 | ○ | ○ |
| SCREEN D | 6 | ○ | × |
| SCREEN E | 7 | ○ | × |
| SCREEN F | 8 | ○ | × |
| SCREEN G | 9 | ○ | × |
| SCREEN H | 12 | ○ | × |
| SCREEN I | 12 | ○ | × |
| SCREEN J | 16 | ○ | × |

F I G. 16

| PAPER INFORMATION | | PLAIN PAPER | COATED PAPER |
|---|---|---|---|
| GRAMMAGE | – | 68 | 128 |
| PAPER THICKNESS | μm | 93.7 | 109 |
| DENSITY | g/cm³ | 0.77 | 1.19 |
| SURFACE RESISTIVITY | Ω/□ | 2.45 E+11 | 1.16 E+10 |
| VOLUME RESISTIVITY | Ω·cm | 1.17 E+11 | 6.79 E+10 |
| BEKK SMOOTHNESS | sec | 39.3 | 587 |
| GURLEY AIR PERMEANCE | sec | 12 | 7555.3 |
| HUE (L*) | – | 92.6 | 93.3 |
| HUE (a*) | – | 0.3 | 0.4 |
| HUE (b*) | – | 1.2 | –0.3 |
| WHITENESS LEVEL (ISO) | % | 80.4 | 84 |
| DEGREE OF GLOSS 75° | % | 5.4 | 71.2 |

IMAGE FORMING APPARATUS FOR CONTROLLING TO MAKE THE DOT SIZE OF THE HIGHLIGHT PART DIFFERENT DEPENDING ON THE TYPE OF RECORDING MATERIAL, AND METHOD OF CONTROLLING THE SAME, AND STORAGE MEDIUM

BACKGROUND OF THE INVENTION

Field of the Invention

The present invention relates to an image forming apparatus, a method of controlling the same, and a storage medium.

Description of the Related Art

Image formation in accordance with an electrophotographic method employs an electrophotographic process for uniformly charging a surface of a photosensitive member, exposing the charged surface by a laser beam or the like modulated in accordance with an image signal to form an electrostatic latent image, developing the electrostatic latent image by toner, and transferring the toner image to a printing material. In other words, when a uniformly charged photosensitive member is exposed by a laser beam in accordance with an image signal, the potential of the exposed photoreceptor surface attenuates, and an electrostatic latent image is formed at that portion. Upon applying a developing bias between the photosensitive member where the electrostatic latent image is formed and a carrier of developer, the electrostatic latent image is developed by toner adhering thereto in accordance with a potential difference between the potential after the exposure and a developing potential. By transferring a toner image formed in this way to a printing material such as a sheet, an image is formed on the printing material.

Efforts have been made in the past to more faithfully reproduce the halftone dots in an electrophotographic image forming apparatus or a printing apparatus that represents halftones by using dots such as halftone dots. As an example of such a technique, for example Japanese Patent Laid-Open No. H8-305005 proposes a method for realizing halftone dot reproduction by at least two modulation methods.

However, even in a case where a tone representation is performed using such frequency modulation, in an electrophotographic image forming apparatus, there are cases where disappearance or lack of dots occurs in accordance with a usage condition or a type of printing material used by the image forming apparatus, resulting in an image having bad graininess.

SUMMARY OF THE INVENTION

An aspect of the present invention is to eliminate the above-mentioned problem with conventional technology.

A feature of the present invention is to provide a technique that can improve the quality of an image in a highlight region, irrespective of a type of printing material used in image formation.

According to a first aspect of the present invention, there is provided an image forming apparatus operable to perform image formation by transferring and fixing an image formed on an image carrier to a printing material, the apparatus comprising: a memory device that stores a set of instructions; and a processor that executes the instructions stored in the memory device to function as: an obtaining unit that obtains a type of the printing material to be used in image formation; a selection unit that selects a smallest dot size of a halftone dot pattern representing a halftone of a highlight region and corresponding to the type of the printing material; and a control unit that performs exposure control for the image carrier by using a screen representing the selected smallest dot size.

According to a second aspect of the present invention, there is provided a method of controlling an image forming apparatus operable to perform image formation by transferring and fixing an image formed on an image carrier to a printing material, the method comprising: obtaining a type of the printing material to be used in image formation; selecting a smallest dot size of a halftone dot pattern representing a halftone of a highlight region and corresponding to the type of the printing material; and performing exposure control of the image carrier by using a screen representing the selected smallest dot size.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 depicts a view for describing details of an image forming unit of the printer engine according to the embodiment.

FIGS. 6A through 6C depict views for describing halftone dots used in tone reproduction of typical AM screening.

FIG. 7 depicts a view for describing a state for forming a patch image for reference on the photosensitive drum.

FIG. 12 depicts an explanatory view conceptually illustrating a spatial frequency characteristic VTF at a visual viewing distance of 300 mm which is a sensitivity characteristic with respect to a spatial frequency of a human visual sense.

FIG. 13 depicts a schematic view of minimum dots of screens according to the embodiment.

FIGS. 14A and 14B depict views for verifying dot reproducibility and the likelihood for dots to not be conspicuous when cyan toner is used by the image forming apparatus according to the embodiment.

FIGS. 15A and 15B depict views for verifying dot reproducibility and the likelihood for dots to not be conspicuous when black toner is used by the image forming apparatus according to the embodiment.

FIG. 16 depicts a view for explaining paper information of plain paper and coated paper that are used in the embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

In addition, in the following description, description is given of an image forming apparatus as an electrophotographic color copying machine having a plurality of photosensitive drums (image carriers), but the present invention is not limited to this. It goes without saying that the present invention can also be applied to, for example, a printer or a copying machine of various methods, and an image forming apparatus of a monochromatic method or a method other than electrophotography.

Figure 1:
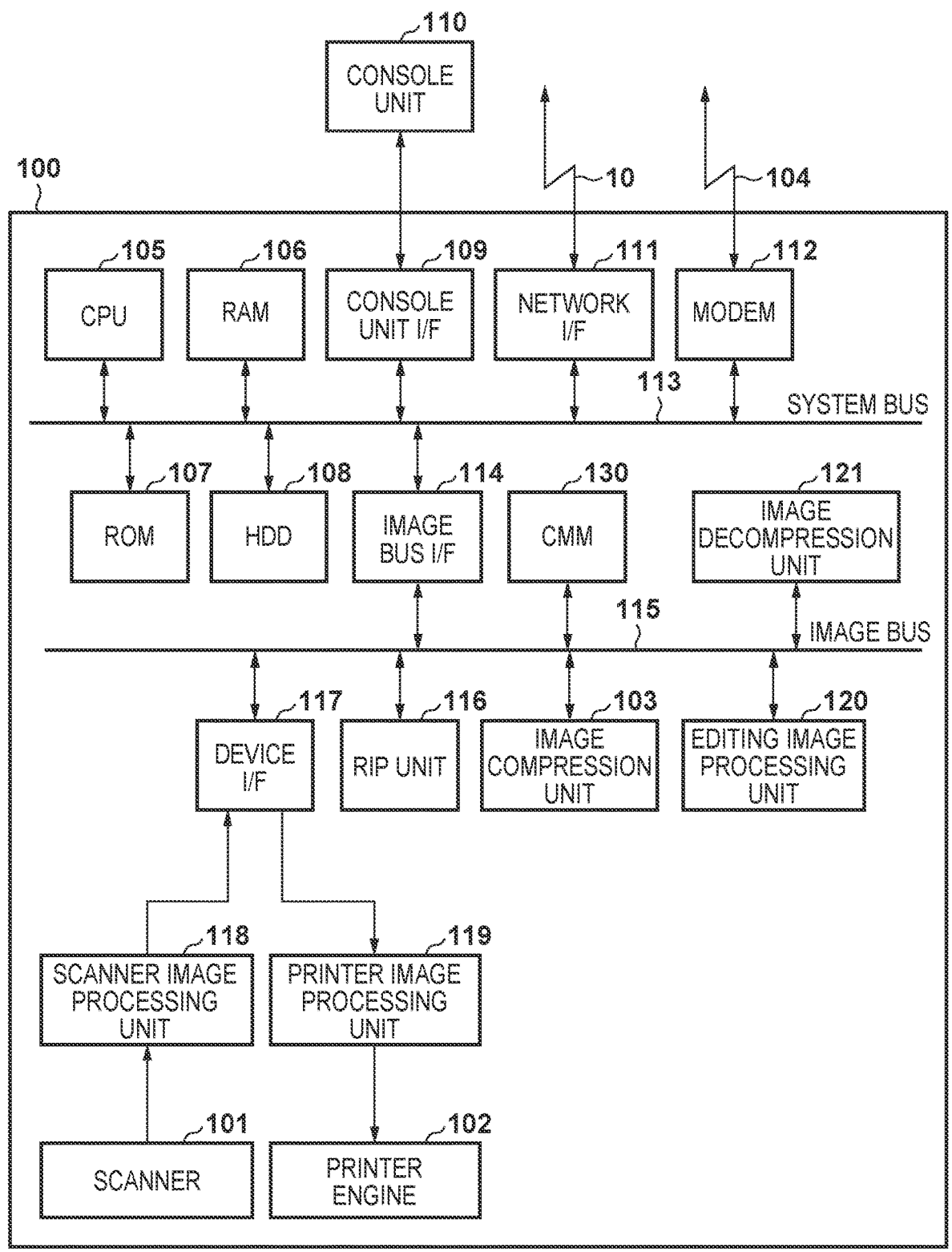
FIG. 1 is a block diagram for describing a configuration of an image forming apparatus according to an embodiment.

FIG. 1 is a block diagram for describing a configuration of an image forming apparatus 100 according to the embodiment.

The image forming apparatus 100 has a scanner 101 which is an image input device, and a printer engine 102 which is an image output device. The scanner 101 is connected to a device I/F (interface) 117 via a scanner image processing unit 118, and the printer engine 102 is connected to the device I/F 117 via a printer image processing unit 119. The scanner image processing unit 118 and the printer image processing unit 119 respectively perform image processing for reading or print output of image data. In addition, the image forming apparatus 100 is connected to a LAN 10 and a public line 104, and inputs/outputs image information or device information via the LAN 10 or the public line 104.

A CPU 105 is a central processing unit for controlling operation of the image forming apparatus 100. A RAM 106 provides a work memory for the CPU 105 to operate, and also functions as an image memory to temporarily store inputted image data. A ROM 107 is a boot ROM, and stores a boot program. An HDD 108 is a hard disk drive, and stores, for example, image data that has been inputted and system software for various processing. The CPU 105 executes the boot program of the ROM 107 to deploy a program and OS stored in the HDD 108 to the RAM 106, and controls operation of the image forming apparatus 100 by executing this deployed program.

A console unit I/F 109 is an interface for a console unit 110 that has a display screen capable of displaying image data or the like, and outputs screen data or the like to the console unit 110. In addition, the console unit I/F 109 is responsible for a role of conveying to the CPU 105 information inputted by a user via the console unit 110. A network I/F 111 is realized by a LAN card or the like, for example, and connects to the LAN 10 to perform input/output of information with an external apparatus (not shown). In addition, a modem 112 connects to the public line 104 to perform input/output of information with an external apparatus (not shown). The above units are arranged on a system bus 113. The console unit 110 may have a touch panel.

An image bus I/F 114 is an interface for connecting the system bus 113 and an image bus 115 for transferring image data at high speed, and functions as a bus bridge for converting a data structure. A raster image processor (RIP) unit 116, the device I/F 117, the scanner image processing unit 118, an editing image processing unit 120, an image compression unit 103, an image decompression unit 121, and a color management module (CMM) 130 are connected to the image bus 115.

The RIP unit 116 develops page description language (PDL) code to image data. The device I/F 117 connects to the scanner 101 or the printer engine 102 via the scanner image processing unit 118 and the printer image processing unit 119, and converts between synchronous and asynchronous image data. In addition, the scanner image processing unit 118 performs various processing such as correction and editing with respect to image data inputted from the scanner 101. The editing image processing unit 120 performs various image processing such as rotation, color processing, binarization, and multi-value conversion of image data. When first storing image data that has been processed by the RIP unit 116, the scanner image processing unit 118, or the editing image processing unit 120 to the HDD 108, the image compression unit 103 encodes this image data by a predetermined compression technique. In a case of outputting, by the printer engine 102, image data that has been compressed and stored in the HDD 108 after processing by the printer image processing unit 119 or after processing by the editing image processing unit 120, the image decompression unit 121 decodes and decompresses the data which has been compressed and encoded. The printer image processing unit 119 performs image processing, a correction, and the like in accordance with the printer engine 102 on image data to be subject to print output. The CMM 130 is a dedicated hardware module for performing color conversion processing (also referred to as color space conversion processing) based on a profile or calibration data, with respect to image data. A profile is information such as a function for converting color image data represented by a color space that depends on a device to a color space that does not depend on a device (for example, a Lab color space, or the like). Calibration data is data for correcting a color reproduction characteristic of the printer engine 102 or the scanner 101.

Figure 2:
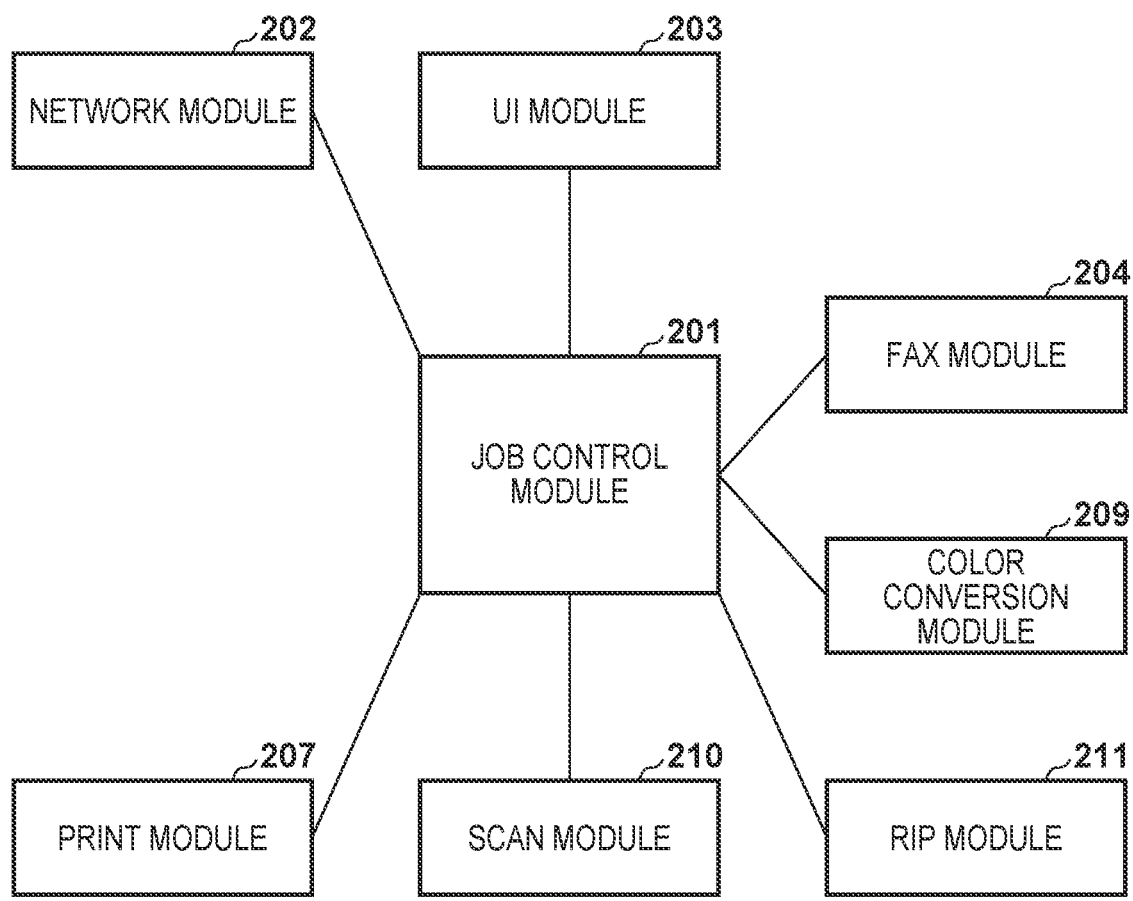
FIG. 2 is a functional block diagram for describing functions according to software modules that the image forming apparatus according to the embodiment has.

FIG. 2 is a functional block diagram for describing function in accordance with software modules held by the image forming apparatus 100 according to the embodiment. These functions are realized by the CPU 105 deploying a program stored in the HDD 108 to the RAM 106, and executing the deployed program.

A job control module 201 comprehensively controls each software module illustrated and not illustrated, and controls all jobs that occur in the image forming apparatus 100, such as copying, printing, scanning, and FAX transmission and reception. A network module 202 is a module for controlling communication with an external unit that is mainly performed via the network I/F 111, and performs communication control with each device on the LAN 10. A UI (user interface) module 203 performs control mainly for the console unit 110 and the console unit I/F 109. A FAX module 204 controls a FAX function. The FAX module 204 transmits or receives a FAX via the modem 112. A print module 207, based on an instruction from the job control module 201, controls the editing image processing unit 120, the printer image processing unit 119, and the printer engine 102 to print an instructed image. The print module 207 receives from the job control module 201 information such as image data, image information (the size, the color mode, resolution, and the like for the image data), layout information (offset, enlargement/reduction, imposing, or the like), and output sheet information (size, print direction, or the like). The print module 207 controls the image compression unit 103, the image decompression unit 121, the editing image processing unit 120, and the printer image processing unit 119 to perform image processing that is appropriate for the image data. The print module 207 controls the printer engine 102 to cause it to perform printing of the image data to a sheet.

A scan module 210 controls the scanner 101 and the scanner image processing unit 118, based on an instruction from the job control module 201, and causes reading of an original in the scanner 101 to be performed. The scan module 210 executes a scan of an original on an original platen in the scanner 101, and is input with image data of the original. Color information of the inputted image data is notified to the job control module 201. Furthermore, the scan module 210 controls the scanner image processing unit 118 to, after performing appropriate image processing such as compression of image data on the inputted image data, notify image data that has been image processed to the job control module 201. A color conversion module 209 performs, based on an instruction from the job control module 201, color conversion processing on instructed image data, and notifies image data after the color conversion processing to the job control module 201. A RIP module 211 performs PDL interpreting based on an instruction from the job control module 201, and controls the RIP unit 116 to perform rendering to thereby perform development to a bitmap image.

Description is given regarding operation where the image forming apparatus 100 described above performs printing based on a print job received via the LAN 10.

PDL data transmitted from an external apparatus via the LAN 10 is received by the network I/F 111, and inputted to the RIP unit 116 via the image bus I/F 114. The RIP unit 116 analyzes the received PDL data, and converts it to code data that the RIP unit 116 can process. The RIP unit 116 then executes rendering based on the converted code data. Bitmap data for each page rendered by the RIP unit 116 is compressed by the image compression unit 103 which is a subsequent stage, and sequentially stored in the HDD 108. The compressed data stored in the HDD 108 in this way is read at a time of a print operation in accordance with an instruction from the job control module 201, and decompression processing of the data is performed by the image decompression unit 121. The image data decompressed by the image decompression unit 121 in this way is inputted to the printer image processing unit 119 via the device I/F 117.

Figure 3:
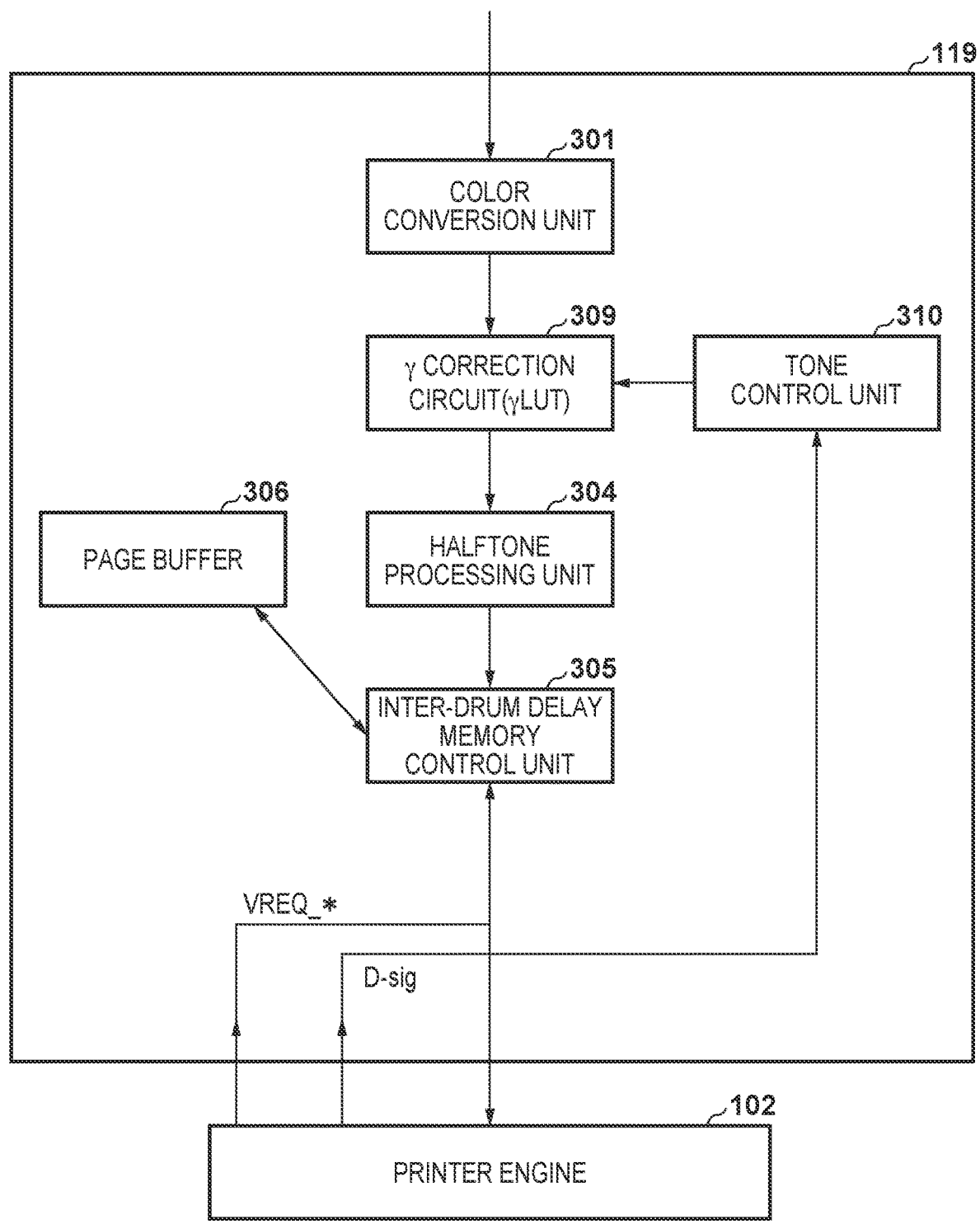
FIG. 3 is a block diagram for describing a functional configuration of a printer image processing unit according to the embodiment.

FIG. 3 is a block diagram for describing a functional configuration of the printer image processing unit 119 according to the embodiment.

A color conversion unit 301 converts the image data from luminance values (RGB, YUV, or the like) to density values (CMYK, or the like). In other words, the color conversion unit 301 converts the inputted image data to data of a color space corresponding to a color component that the printer engine 102 can print. A density signal of multi-value image data converted in this way is converted to a signal value for the printer engine 102 to reproduce the densities in accordance with a gamma correction circuit 309 (hereinafter, a γLUT). The γ LUT 309 is a lookup table for a gamma conversion, and is created by tone control that is described later.

A tone control unit 310 performs processing relating to the tone control that is described later. The tone control unit 310 determines an image pattern to be used in the tone control, and inputs the image data to a halftone processing unit 304 through the γLUT 309. In such a case, the γLUT 309 is set to a linear table for which input and output levels are equal, and input data for which γ characteristics of the printer engine 102 can be detected is set. A detection result of this image pattern (D-sig) is received, via the device I/F 117, by a density sensor (801 in FIG. 8) that is described later, and a γLUT is generated in accordance with this result by a method that is described later, and set to the γ LUT 309. Image data corrected by the γLUT 309 undergoes halftone processing by the halftone processing unit 304, and is converted to image data in which each color component of one pixel is represented by a binary value (one bit). A typical dither matrix method, an error diffusion method, or the like is used in the halftone processing here, but any method may be used in the present embodiment. Note that the halftone processing is not limited to the above method, and another method may be used.

The binary image data generated by the halftone processing unit 304 in this way is separated, via an inter-drum delay memory control unit 305, into each color component for each pixel of the image data, temporarily stored to a page buffer 306. At a timing when a video data request signal corresponding to each color component transmitted by the printer engine 102 is inputted, the image data of each corresponding color component is read from the page buffer 306 and sent to the printer engine 102. Note that the video data request signal is assumed to be VREQ_Y, VREQ_M, VREQ_C, and VREQ_K for respective color components. Because the timing of exposure control for each photosensitive drum corresponding to each color differs in accordance with the distance from upstream to downstream where a photosensitive drum 501 (FIG. 5) corresponding to the respective color component is arranged in the printer engine 102, the timing for reading the data for each color component also differs.

Next, description is given regarding a two-component developer used in the present embodiment.

The two-component developer is configured with a nonmagnetic toner and a low magnetization and high resistance carrier as principal components. The nonmagnetic toner is configured by using a binding resin such as a styrene resin or a polyester resin, a colorant such as carbon black, a dye, or a pigment, a release agent such as wax, a charge particle agent, or the like in appropriate amounts. Such a nonmagnetic toner can be manufactured by a method such as a pulverization method or a polymerization method. Note that, for the nonmagnetic toner (negative chargeability), a frictional electrification amount of approximately $-1\times10^{-2}$ to $5.0\times10^{-2}$ C/Kg is desirable. If the frictional electrification amount of the nonmagnetic toner deviates from this range, there are cases where a counter charge amount that occurs in the magnetic carrier increases, with an unprinted portion level worsening to cause an image defect. The frictional electrification amount of the nonmagnetic toner may be adjusted in accordance with, for example, a type of material used, and may be adjusted by the addition of an additive agent. The frictional electrification amount of the nonmagnetic toner can be measured by using a typical blowoff method where an approximately 0.5 to 1.5 g amount of the developer is taken, toner is suctioned from the developer by air suction, and a charge amount induced by a measurement container is measured.

In addition, it is possible to use something publicly known for the magnetic carrier. For example, a resin carrier formed by dispersing, in resin, magnetite as a magnetic material and dispersing carbon black for conductivity and resistance adjustment, may also be used. In addition, something that has been subject to resistance adjustment where the surface of magnetite such as ferrite on its own is subject to oxidation and reduction processing may be used. In addition, something that has been subject to resistance adjustment where the surface of magnetite such as ferrite on its own is coated by a resin may be used. A method of manufacturing these magnetic carriers is not particularly limited.

Note that it is desirable that the magnetic carrier has magnetization of $3.0\times10^4$ A/m to $2.0\times10^5$ A/m in a magnetic field of 0.1 T. When the magnetization amount of the magnetic carrier is reduced, there is an effect for suppressing scavenging due to a magnetic brush, but adhesion to the non-magnetic cylinder by the a magnetic field generating unit becomes difficult, and there are cases where an image defect such as magnetic carrier adhesion to the photosensitive drum or an image defect such as a sweep out texture occur. In addition, when the magnetization of the magnetic carrier is greater than the above range, there are cases where an image defect occurs due to the pressure of the magnetic brush as described above.

Furthermore, for the volume resistivity of the magnetic carrier, considering leakage and developing performance, using something in the range of $10^7$ to $10^{14}$ Ωcm is desirable. The magnetization of a carrier is measured using BHV-30 which is an oscillating field type magnetic property automatic recording apparatus manufactured by Riken Denshi Co. Ltd. For a magnetic property value of carrier powder, a 0.1 T external magnetic field is produced, and the strength of magnetization at that time is obtained. The carrier is put in a state in which it is packed in a cylindrical plastic container so as to be sufficiently dense. The magnetization moment in this state is measured, the actual weight at the time when the sample has been placed is measured, and the strength of the magnetization is obtained (AM2/Kg). Next, the true specific gravity of a carrier particle is obtained by a dry type automatic density form AccuPyc (manufactured by Shimadzu Corporation), and by multiplying the strength of the magnetization (AM2/Kg) by the true specific gravity, it is possible to obtain the strength of the magnetization per unit area (A/m) which is used in the present embodiment.

Next, description is given regarding operation when color component data outputted by the printer image processing unit 119 is inputted to the printer engine 102.

Figure 4:
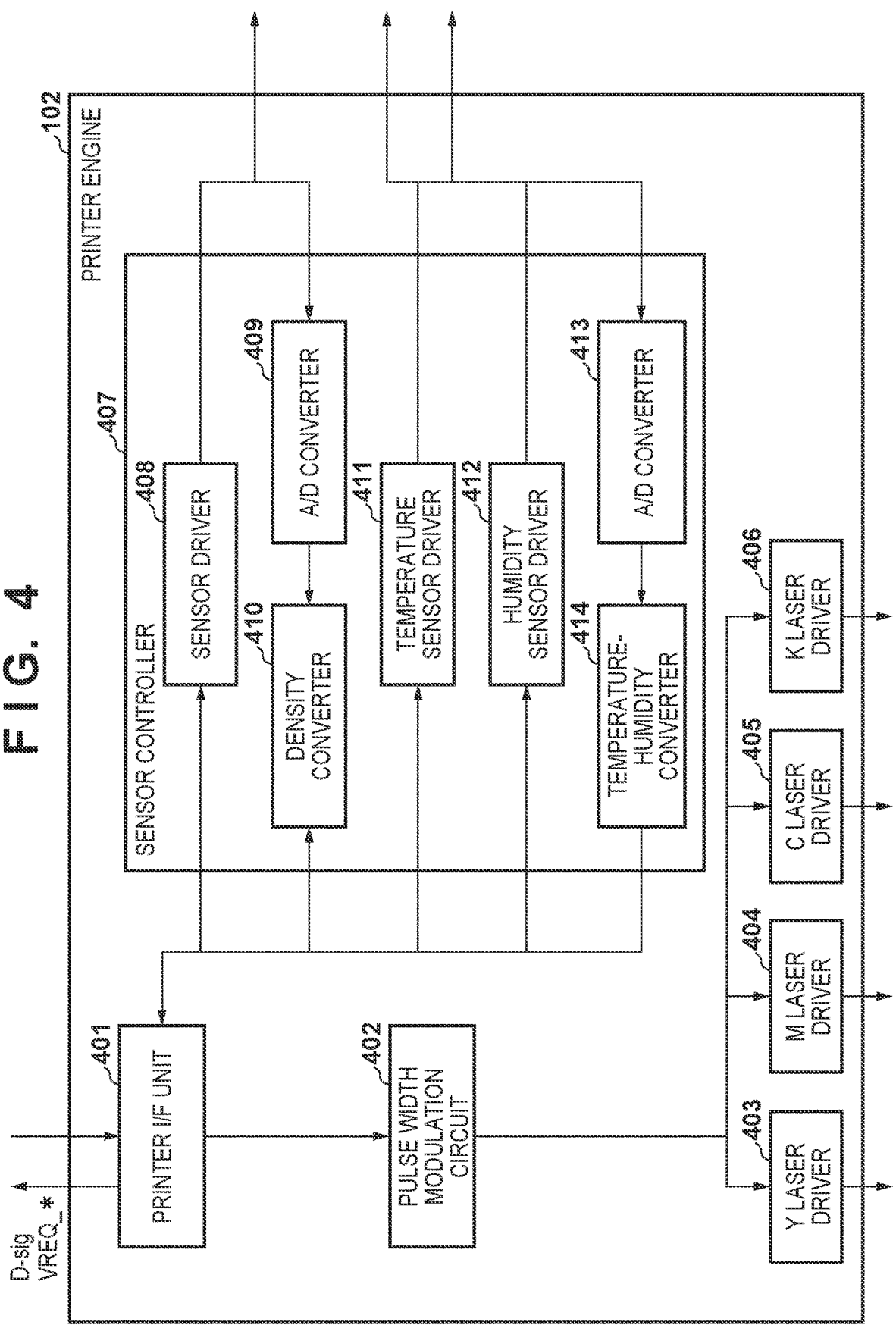
FIG. 4 is a block diagram for describing an internal configuration of a printer engine according to the embodiment.

FIG. 4 is a block diagram for describing an internal configuration of the printer engine 102 according to the embodiment.

A printer I/F unit 401 receives the color component data that is sequentially transmitted from the printer image processing unit 119. In addition, in a case where preparation for a print operation in the printer engine 102 is possible, the printer I/F unit 401 issues VREQ_* (where * is any of Y/M/C/K) which is a video data request signal for requesting data for a corresponding color component.

Color component data is inputted to a pulse width modulation circuit 402 via the printer I/F unit 401. The pulse width modulation circuit 402, based on the actual color component data, generates a pulse signal (a driving signal) for driving respective laser drivers 403 through 406 for each color that are a subsequent stage, and transmits the pulse signal to the respective laser drivers 403 to 406. Each of the laser drivers 403 to 406 which corresponds to a respective color component drives a laser exposure unit that corresponds to the respective color component based on a pulse signal received from the pulse width modulation circuit 402.

A sensor controller 407 detects, in accordance with a sensor driver 408 and a density sensor 801, the density of an image pattern outputted by the tone control unit 310, and converts the detected value into a density value (D-sig) in accordance with an A/D converter 409 and a density converter 410. The density value (D-sig) is taken as a detection result and transmitted to the tone control unit 310 via the printer I/F unit 401.

Inside the developing unit, a temperature sensor driver 411 and a humidity sensor driver 412 are provided, and output values thereof are taken as humidity information in accordance with an A/D converter 413 and a temperature-humidity converter 414, and sent to the tone control unit 310 via the printer I/F unit 401.

FIG. 5 depicts a view for describing detail of an image forming unit of the printer engine 102 according to the embodiment. Description is given mainly for an image forming unit for a yellow image below, but because the image forming units for the other color components of the magenta, cyan and black are similar, description thereof is omitted. The configuration of an image forming unit of each color component is represented by adding M, C, or K which correspond to respective colors to the end of a reference numeral representing a configuration element of the image forming unit for yellow images, but to make the drawings concise, a portion thereof is omitted. In the following description, if description for M, C, and K which correspond to respective colors is unnecessary, such description is omitted.

The printer engine 102 is provided with the photosensitive drum 501 which is an image carrier, a charge roller 502, a Y laser exposure unit 503, a primary transfer unit 504, a secondary transfer unit 505, a fixing unit 506, and a cleaning unit 507. The Y laser exposure unit 503 is driven by the Y laser driver 403. The primary transfer unit 504 primary transfers a visualized toner image onto a transfer medium (an intermediate transfer belt) 508. The secondary transfer unit 505 secondary transfers the toner image formed on the intermediate transfer belt 508 to a sheet. The fixing unit 506 fixes the toner image which has been transferred onto a sheet. The cleaning unit 507 removes transfer residual toner remaining on the intermediate transfer belt 508 after the secondary transfer.

A developing unit 509 is provided with a developer container, and accommodates developer in which magnetic carrier particles (carrier) and toner particles (toner) are mixed as a two-component developer. An A screw 510 and a B screw 511 respectively perform conveyance of toner particles and mixing with magnetic carrier particles. In addition, a developing sleeve 512 is arranged near the photosensitive drum 501, rotates so as to follow the photosensitive drum 501, and carries developer in which toner and carrier are mixed. The developer carried by the developing sleeve 512 makes contact with the photosensitive drum 501, and the electrostatic latent image on the photosensitive drum 501 is developed. In addition, a developer internal temperature sensor 513 is arranged inside the developing unit 509, and a developer external humidity sensor 514 is arranged outside the developing unit 509. The temperature sensor driver 411 inside the developer and the humidity sensor driver 412 outside the developer of the sensor controller 407 operate, and output values thereof are set as humidity information in accordance with the A/D converter 413 and the temperature-humidity converter 414. This is taken as a detection result and transmitted to the tone control unit 310 via the printer I/F unit 401. Note that, in addition to the configuration of FIG. 5, the printer engine 102 has, for example, a conveyance unit (not shown) for conveying sheets, but description thereof is omitted in the present embodiment.

In the configuration of the printer engine 102 as above, when forming a yellow image, the photosensitive drum 501 is exposed by the Y laser exposure unit 503, which is driven by the Y laser driver 403, to form an electrostatic latent image on the photosensitive drum 501. The formed electrostatic latent image is visualized as a toner image in accordance with yellow developer carried on the developing sleeve 512 of the developing unit 509, and the visualized toner image is transferred to the intermediate transfer belt 508 by the primary transfer unit 504.

Similarly, image data for respective color components of the magenta, cyan, and black are developed by the respectively corresponding developing units 509M through 509K, and toner images are visualized on each of the photosensitive drums 501M through 501K. The visualized toner images are sequentially transferred by the respective primary transfer units 504M to 504K in synchronization with the toner image of the color component transferred immediately prior, and a final toner image formed by toner images of the four colors is formed on the intermediate transfer belt 508. The toner image formed on the intermediate transfer belt 508 in this way is secondary transferred by the secondary transfer unit 505 to a sheet that is conveyed in synchronization, and the toner image is fixed by the fixing unit 506 on the sheet. The sheet on which image formation (printing) by the printer engine 102 has been performed is discharged, and the print operation ends. In addition, in an interval from a primary transfer position to a secondary transfer position, a photosensor 520 that includes an LED and a photodiode and is for detecting a reflected light amount of a patch pattern formed on the intermediate transfer belt 508 is provided relative to the intermediate transfer belt 508. A near-infrared ray from the intermediate transfer belt 508 that is incident on the photosensor 520 is converted to an electrical signal by the photosensor 520. The electrical signal is converted to a digital signal by the A/D converter 409, taking an output voltage of 0 to 5V to be 0 to 1023 levels, and converted to a density signal by the density converter 410.

The toner density of the developer in the developing unit 509 decreases due to development of electrostatic latent images. Accordingly, control (toner supply control) for supplying toner from a toner replenishment basin 515 to the developing unit 509 is performed by a toner supply control unit that corresponds to a respective color. In this way the toner density of the developer is controlled to be constant as much as possible, and the image density is controlled to be constant as much as possible.

The image forming apparatus 100 according to the embodiment has a density control apparatus of a type (a patch detection ATR) for forming a patch image on the photosensitive drum 501, and detecting and controlling an image density of the patch image in accordance with a density sensor (a patch detection ATR sensor) installed facing the photosensitive drum 501. In addition, the image forming apparatus 100 has a density control apparatus of a type (developer reflection ATR) for detecting and controlling a toner density of the developer in the developing unit 509 in accordance with a toner density sensor (a developer reflection ATR sensor). Furthermore, the image forming apparatus 100 has a density control apparatus of a type (video count ATR) for calculating and controlling a necessary toner amount from an output level of a digital image signal for each pixel from a video counter. In this way, the image forming apparatus 100 according to the embodiment is provided with density control apparatuses of three types.

FIGS. 6A through 6C depict views for describing halftone dots used in tone reproduction for typical AM screening (Amplitude Modulated Screening).

As illustrated in FIGS. 6A through 6C, each dot has an arbitrary shape such as a circle, an elliptical shape, a square, or a rectangle (a circle in FIGS. 6A through 6C), and represents a tone by area modulation that changes the dot size in accordance with density.

Next, description is given regarding image density detection and image tone control.

In the present embodiment, while forming consecutive images, the CPU 105 causes a pattern for detection of image density (a patch image Q) 701 to be formed on a non-image region sandwiched between a trailing edge and a leading edge of outputted images (hereinafter, "between images"), as illustrated in FIG. 7. Note that an electrostatic latent image of the patch image is also referred to as a "patch latent image" below.

In other words, the printer image processing unit 119 is provided with a patch image signal generation circuit (a pattern generator (not shown)) for generating a patch image signal that has a signal level corresponding to a density that is set in advance. A patch image signal from the pattern generator is supplied to the pulse width modulation circuit 402 to cause a laser driving pulse having a pulse width corresponding to the above density that is set in advance to be generated. The laser driving pulse is supplied to the semiconductor laser of the laser exposure unit 503, to cause the semiconductor laser to emit light for only an amount of time corresponding to the pulse width thereof, to scan and expose the photosensitive drum 501. Thereby, a patch latent image corresponding to the density set in advance is formed on the photosensitive drum 501. The patch latent image is developed by the developing unit 509.

A reflected light amount from the patch image 701 formed on the photosensitive drum 501 is measured by a density sensor 801 (FIG. 8) which is an image density detection unit. The density sensor 801 has a light-emitting unit provided with a light emitting element such as an LED, and a light-receiving unit provided with a light receiving element such as a photodiode (PD). The density sensor 801 measures the reflected light amount described above at a timing when the patch image 701 formed "between images" on the photosensitive drum 501 passes under the density sensor 801. A signal (D-sig) for this measurement result is inputted to the CPU 105. Subsequently, when the CPU 105 obtains a correction amount (described later) for an amount of replenishment toner for which is it estimated that a desired certain density (reflected light amount) will be obtained. During consecutive image formation, the patch image 701 is caused to be formed (between images) at a non-image region sandwiched between the trailing edge of an image and the leading edge of a subsequent image for each 200 sheets outputted. Therefore, the patch image 701 is formed between images for each 200 sheets of consecutive image formation.

In the present embodiment, description was given for an example where the patch image is formed on the photosensitive drum 501 and the density thereof is measured, but it is possible to form and measure a patch image on the intermediate transfer belt 508.

Description is given in further detail below.

Figure 8:
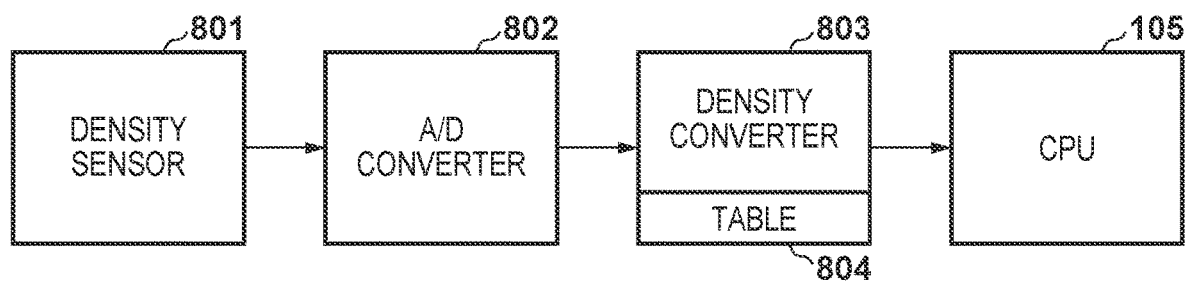
FIG. 8 is a block diagram for describing an example of a circuit configuration for processing an output signal of a density sensor.

FIG. 8 is a block diagram for describing an example of a circuit configuration for processing an output signal of the density sensor 801.

Reflected light (a near-infrared ray) from the photosensitive drum 501 that is inputted to the density sensor 801 is converted to an electrical signal. The electrical signal which is 0 through 5V is converted to an 8-bit digital signal by the A/D converter 802. The digital signal is converted to density information by the density converter 803. The density converter 803 refers to a table 804 to convert the 8-bit digital signal to the density signal.

Here, the toner is something in which a color material of the respective color is caused to be dispersed, with a styrene copolymer resin as a binder. In addition, the photosensitive drum 501 is an OPC photoconductive element whose reflectance for a near-infrared ray (960 nm) is approximately 40%. However, it may be, for example, a photosensitive member of an amorphous silicon-base whose reflectance is of the same degree. In addition, in this embodiment, the density sensor 801 is configured so as to detect only specular light reflected from the photosensitive drum 501.

Figure 9:
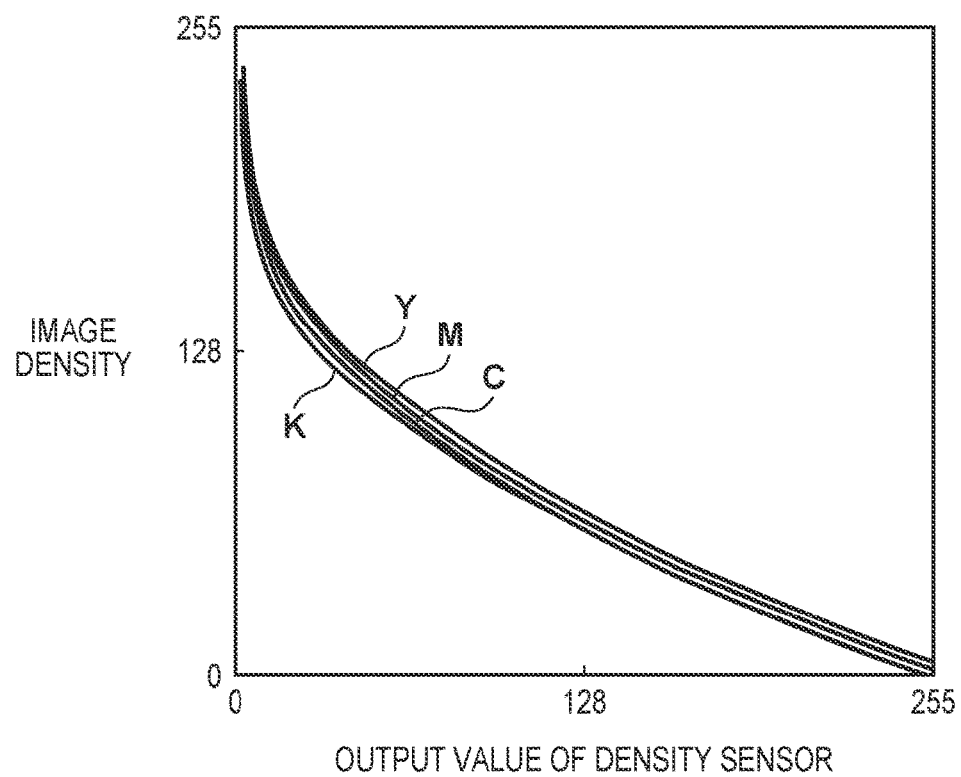
FIG. 9 depicts a view illustrating the relationship between the density of a patch image and an output value of a density sensor at a time when the density of the patch image which is formed on a photosensitive drum is gradually changed in accordance with area coverage modulation for a respective color.

FIG. 9 depicts a view illustrating the relationship between the density of a patch image and an output value of the density sensor 801 at a time when the density of the patch image 701 which is formed on the photosensitive drum 501 is gradually changed in accordance with area coverage modulation for a respective color. Note that the output of the density sensor 801 is set to 5V, in other words 255 levels, in a state where toner is not adhered to the photosensitive drum 501.

As illustrated by FIG. 9, the area covering ratio in accordance with each toner color increases, and the output value of the density sensor 801 decreases in accordance with an increase in the image density. A dedicated table 804 for each color is prepared in advance to convert the output value of the density sensor 801 to a density signal, based on such characteristics of the density sensor 801. The table 804 is stored in a storage unit of the density converter 803. Consequently, the density converter 803 can read the image density of each color with good accuracy. The density converter 803 outputs to the CPU 105 the density information obtained in accordance with such a conversion.

Note that, in this embodiment, a density signal of 64 levels is used for each color as the laser output when forming the patch image 701. In such a case, the laser output is decided by using a tone correction table (a LUT).

In the present embodiment, control is performed so as to form the patch image 701 on a non-image region during normal image formation, detect the density of the patch image 701, and correct the halftones of images as necessary.

Figure 10:
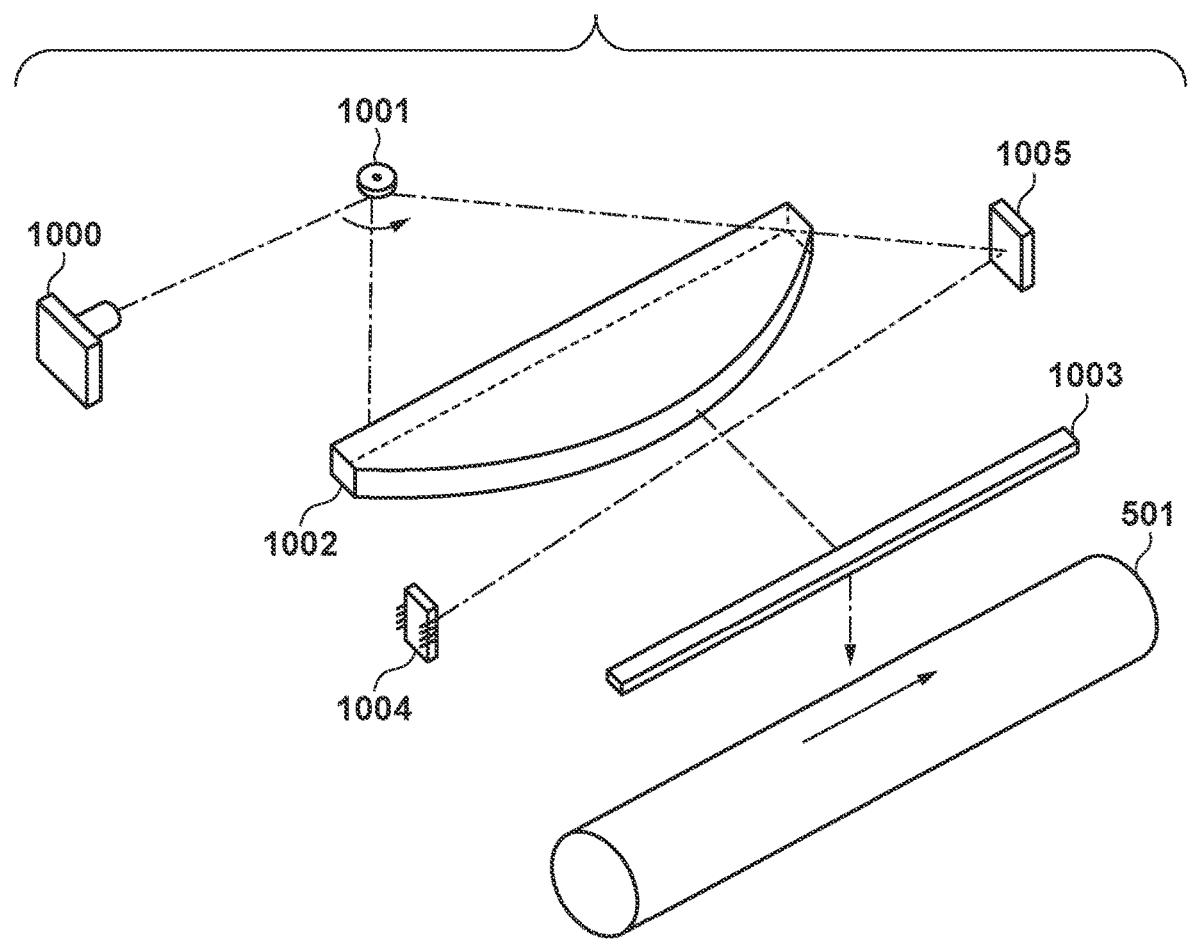
FIG. 10 depicts a view illustrating an example of a laser exposure unit of the image forming apparatus according to the embodiment.

FIG. 10 depicts a view illustrating an example of the laser exposure unit 503 of the image forming apparatus 100 according to the embodiment.

A semiconductor laser (hereinafter may be referred to simply as a laser) 1000 is an example of a light source. The laser 1000 functions as a laser emitting unit for irradiating a beam (a laser beam) by emitting light in accordance with a control signal from an engine controller or a video signal from a video controller which are not illustrated. A polygonal mirror 1001 is an example of a rotating polygonal mirror. The polygonal mirror 1001 is rotated in the direction of an arrow symbol in the drawing by a motor (not shown), reflects the beam from the laser 1000, and the reflected beam scans the photosensitive drum 501. The motor for rotating the polygonal mirror 1001 is controlled to achieve a fixed rotation speed in accordance with an acceleration signal/deceleration signal from the engine controller (not shown). The beam from the laser 1000 scans in the direction of an arrow symbol on the photosensitive drum 501, via an fθ lens 1002 and reversion mirror 1003. The fθ lens 1002 is an optical member for scanning the beam on the photosensitive drum 501 at a constant speed. A beam detector 1004 is an element for converting light to a voltage. The beam reflected by the mirror 1005 provided on the scan path of the beam is incident to the beam detector 1004 at a predetermined timing. The beam detector 1004 generates a BD signal in accordance with a voltage that occurs in accordance with the incident light, and outputs the BD signal to a logic circuit and a CPU of the engine controller which is not illustrated. The BD signal is used as a horizontal synchronization signal at a time of image formation.

A halftone dot used in tone reproduction of normal AM screening has an arbitrary shape such as a circle, an elliptical shape, a square, or a rectangle, and as described above with reference to FIGS. 6A through 6C, represents tone by area modulation for changing the dot size in accordance with density. Consequently, in FIGS. 6A through 6C, the density is in an order of FIG. 6A≤FIG. 6B≤FIG. 6C, and the dot size increases in an order of FIG. 6A≤FIG. 6B≤FIG. 6C together with density. In addition, the sizes of the respective dots in FIGS. 6A, 6B, and 6C are the same.

Figure 11A:
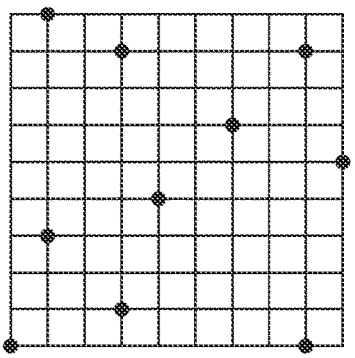
FIGS. 11A through 11C depict views illustrating examples of halftone dot patterns of different densities for screens that define halftone dots used in tone reproduction in the image forming apparatus according to the embodiment.
Figure 11B:
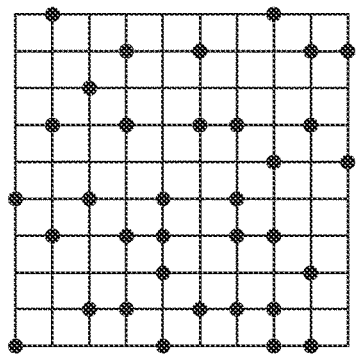

In contrast to this, in this embodiment, screening for halftone reproduction uses conventional AM screening in a density range of approximately 10% or more CMYK (a region other than a highlight region). In addition, the size of dots for forming screening of a highlight region of approximately 20% CMYK or less is fixed. Furthermore, in the highlight region, instead of performing a tone representation by dot size as in a conventional AM screening, configuration is taken so as to perform a tone representation by a number of dots as illustrated by FIGS. 11A and 11B. Configuration is taken to use screening in which the density after fixed size dots have been arranged for all halftone dot growth points represents the tone by increasing the dot size (FIG. 11C), similarly to in a conventional AM screening.

Figure 11C:
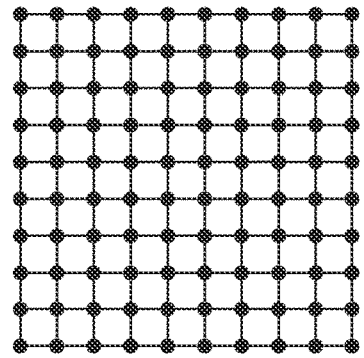

FIGS. 11A through 11C depict views illustrating screening for defining halftone dots used in tone reproduction in the image forming apparatus 100 according to the embodiment, and illustrate examples of halftone dot patterns for respectively different densities.

A tone representation is performed by a number dots in a highlight region, as in FIGS. 11A and 11B. For a region whose density is larger than a density range (FIG. 11C) where fixed size dots have been arranged for all halftone dot growth points, screening that represents the tone by increasing dot size, the same as conventional AM screening, is used.

FIG. 12 depicts an explanatory view for conceptually illustrating a spatial frequency characteristic VTF (Visual Transfer Function) at a visual viewing distance of 300 mm, which is a sensitivity characteristic with respect to a spatial frequency of human vision.

A representative experimental equation that represents a visual spatial frequency characteristic VTF is illustrated below.

$$VTF(u) = 5.05 \times \exp\left\{\frac{-0.138 \times \pi \times L \times u}{180}\right\} \times \left\{1 - \exp\left\{\frac{-0.138 \times \pi \times L \times u}{180}\right\}\right\} \quad \text{Equation (1)}$$

A variable L of Equation (1) represents a viewing distance, and a variable $\underline{u}$ represents a spatial frequency.

In this embodiment, granularity is calculated by the following method in order to evaluate graininess.

As a method of calculating granularity, Dooley and Shaw of Xerox Corporation propose a method for applying Wiener spectrum to graininess measurement, and after performing a cascade with a visual spatial frequency characteristic (Visual Transfer Function: VTF), set an integrated value as a granularity (GS).

$$GS = \exp(-1.8\overline{D}) \int \sqrt{(\overline{Ws(u)} \times VTF(u) du)} \quad \text{Equation (2)}$$

du is a spatial frequency, WS(u) is a Wiener spectrum, and VTF(u) is a visual spatial frequency characteristic. The term of $\exp(-1.8\overline{D})$ is a function for correcting a difference between brightness that a person perceives and density, in which average density D is a variable.

The method of calculating granularity according to the embodiment is based on the foregoing Equation (2) of Dooley et. al. that uses a Wiener spectrum and a VTF, and allows for application development.

By making the dot size large and stable in order to improve the granularity, it is possible to suppress the granularity to be low, and in addition the reproducibility of halftone dots is related to GS, and it is possible to suppress the granularity to be low if the reproducibility of halftone dots is high.

However, when the size of halftone dots is large, the dot pattern itself is recognized and print quality is degraded, and so it is desirable to set halftone dots to be as small as possible. In addition, when a smallest dot size is set large, the density is represented by a number of halftone dots, but there is a problem in that a screen pattern is perceived visually when the dots are regularly arranged the same as in normal AM screening. Accordingly, when representing the tone by only the smallest dots as illustrated by FIGS. 11A and 11B, a method for selecting dots at random from growth point dots of the AM screening is employed.

The resolution of the image forming apparatus 100 in the present embodiment has a configuration in which a 1200 dpi exposure system is used, and a screen is generated by binary values for 1200 dpi.

FIG. 13 depicts a schematic view of minimum dots of screens according to the embodiment.

In a case of normal AM screening, 1 pixel at 1200 dpi is the smallest dot as illustrated in a screen A of FIG. 13. Here, the smallest dot sizes are set to sizes as illustrated in FIG. 13. Note that the size of one dot here is the size of one dot at the resolution of 1200 dpi. Here, the screen A is configured by one dot, a screen B is configured by four dots, a screen C is configured by five dots, a screen D is configured by six dots, a screen E is configured by seven dots, a screen F is configured eight dots, a screen G is configured by nine dots, a screen H is configured by 12 dots, a screen I is configured by 12 dots, and a screen J is configured by 16 dots.

In the present embodiment, the smallest dot size changes in accordance with the type of printing material (paper, sheet) on which an image is formed. In other words, image formation is performed after selecting one screen of FIG. 13. This is because the visibility problem is significant, and the amount of change of the dot size in a fixing step will differ and noise or likelihood of dots not being conspicuous will change if, for example a surface property (smoothness, state of unevenness) of a sheet is different. Alternatively, this is because visibility of a dot itself changes if a whiteness level of a sheet changes. Furthermore, this is because if a resistance value of printing material changes, the way in which toner scatters changes, and the visibility of a dot itself and noise change. Therefore, it is necessary to set a precise dot size in accordance with the type of printing material.

Note that, as information indicating the type of printing material, there is information such as grammage, paper thickness, paper density, air permeance, hue, and degree of gloss in addition to a surface property, whiteness level, and resistivity, and a proper smallest dot size is set in association with paper type information as appropriate.

In the present embodiment, coated paper and plain paper are used as types of printing materials, and the reproducibility of dots and the likelihood of dots not being conspicuous is verified.

FIGS. 14A and 14B and FIGS. 15A and 15B depict views illustrating concrete examples for results of the study into dot size, dot reproducibility and likelihood for dots not being conspicuous in the cases where the screens of FIG. 13 are subject to image formation using coated paper and plain paper with cyan toner and black toner, respectively.

In addition, FIG. 16 depicts a view for describing paper information of plain paper and coated paper used in this embodiment.

Plain paper and coated paper are given as examples in FIG. 16, but information of other printing materials is included. The type of such a printing material is specified by at least one piece of information out of a grammage, paper thickness, a density, a surface resistivity, a volume resistivity, a surface roughness, smoothness, air permeance, hue, whiteness level, and degree of gloss of the printing material.

FIGS. 14A and 14B depict views for verifying dot reproducibility and likelihood for dots to not be conspicuous when cyan toner is used, where FIG. 14A illustrates a verification result for plain paper, and FIG. 14B illustrates a verification result for coated paper.

In addition, FIGS. 15A and 15B depict views for verifying dot reproducibility and likelihood for dots to not be conspicuous when black toner is used, where FIG. 15A illustrates a verification result for plain paper, and FIG. 15B illustrates a verification result for coated paper.

As discerned from FIG. 14A, when forming an image on plain paper by cyan toner, dot reproducibility is good and dots are likely not to be conspicuous with screens F and G, and it is evident that the smallest dot sizes are 8 dots and 9 dots. In addition, from FIG. 14B, when forming an image on coated paper by cyan toner, dot reproducibility is good and dots are likely not to be conspicuous with screens C and D, and it is evident that the smallest dot sizes are 5 dots and 6 dots.

In addition, as discerned from FIG. 15A, when forming an image on plain paper by black toner, dot reproducibility is good and dots are likely not to be conspicuous with screens E and F, and it is evident that the smallest dot sizes are 7 dots and 8 dots. In addition, from FIG. 15B, when forming an image on coated paper by black toner, dot reproducibility is good and dots are likely not to be conspicuous with screens B and C, and it is evident that the smallest dot sizes are 4 dots and 5 dots.

In other words, in the case of coated paper, while the reproducibility is good with small dots in comparison to plain paper, it is evident that dots themselves become conspicuous with smaller sizes.

In this way, by changing the smallest dot size used with plain paper and coated paper, it is possible to cause highlight tone reproducibility of an output image to be stable irrespective of the type of printing material.

In addition, it is possible to provide an image forming apparatus that can stably form a high-quality image that has low graininess and color inconsistency and prevent a texture in accordance with a screen pattern from being perceived.

Figure 17:
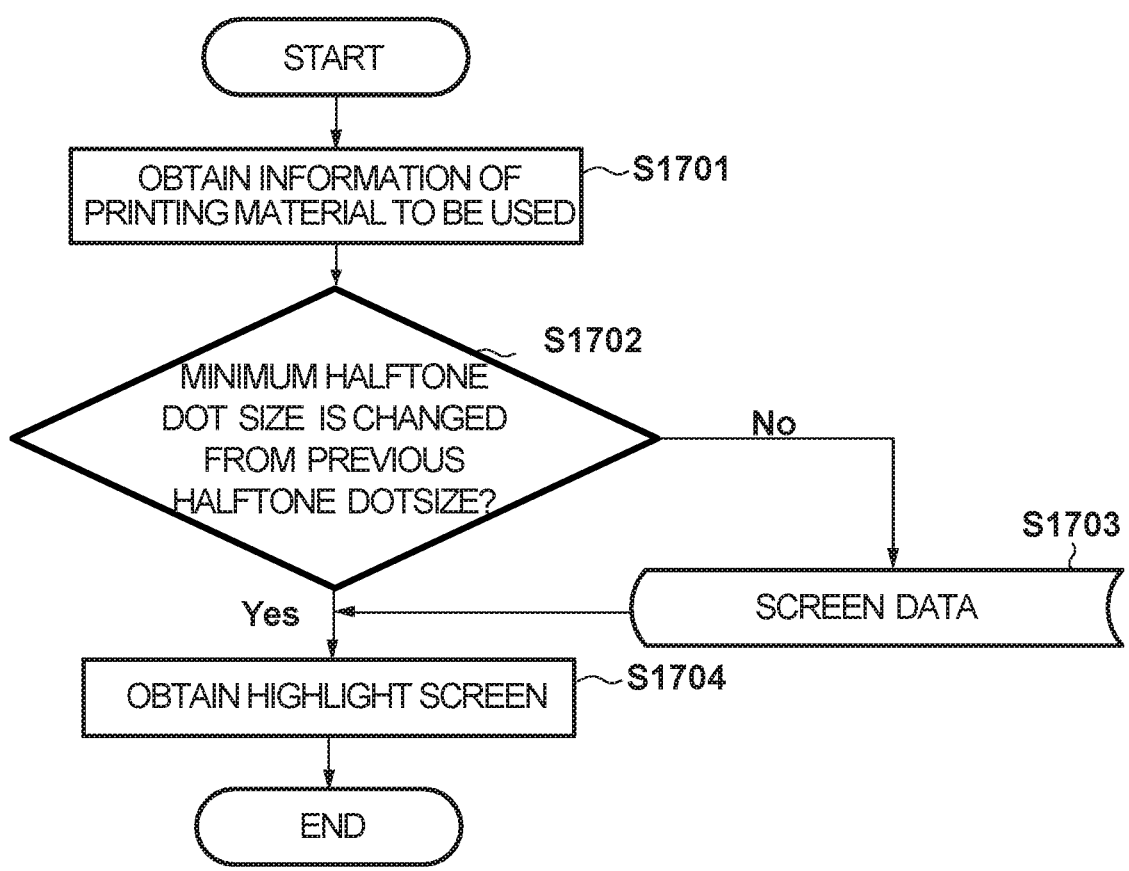
FIG. 17 is a flowchart for describing processing for obtaining a highlight screen by selecting a smallest dot size in accordance with a type of printing material to be used in image formation by the image forming apparatus according to the embodiment.

FIG. 17 is a flowchart for describing processing where the image forming apparatus 100 according to the embodiment selects a smallest dot size in accordance with a type of printing material to be used in image formation, and obtains a highlight screen. Note that the processing illustrated in this flowchart is achieved by the CPU 105 executing a program that has been deployed to the RAM 106.

When starting this processing, a table storing an optimal smallest dot size corresponding to a type of printing material to be used in image forming, based on the verification results of FIGS. 14A and 14B and FIGS. 15A and 15B described above, is registered in advance in the ROM 107 or the HDD 108. In step S1701, the CPU 105 obtains a type of a printing material (sheet) to be used in image formation. The processing proceeds to step S1702, and the CPU 105 decides the smallest dot size by reading an optimal smallest dot size corresponding to the type of the printing material obtained in step S1701, which is stored in the table described above. If the minimum dot size is changed from a previous dot size in step S1702, the processing proceeds to step S1703, screen data for the selected dot size is selected, and the processing proceeds to step S1704. In addition, the processing proceeds to step S1704 when the size of the smallest dot is not changed in step S1702. In step S1704, the CPU 105 obtains the highlight screen pattern corresponding to the smallest dot size, and the processing ends.

In this way, by performing image formation after selecting a screen having an optimal smallest dot size in accordance with the type of printing material to be used in the image formation, it is possible to cause tone reproducibility for a highlight of an output image to be stable regardless of the type of printing material.

In addition, as illustrated in FIGS. 14A and 14B and FIGS. 15A and 15B, the optimal smallest dot size in accordance with the type of printing material also differs with respect to the color of toner to be used in the image formation.

Consequently, it is assumed that the table described above stores the optimal smallest dot size that corresponds to the color of the toner and the type of printing material used in image formation. Configuration may be taken so as to, in step S1702 of the flowchart of FIG. 17, decide the smallest dot size by reading from the table an optimal smallest dot size corresponding to the color of the toner to be used in image formation and the type of the printing material.

Consequently, it is possible to perform image formation by selecting a screen having an optimal smallest dot size that corresponds to the color of the toner and the type of printing material to be used in image formation. Consequently, it is possible to stabilize tone reproducibility of highlights of an output image, irrespective of the type of the printing material.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-123566, filed Jun. 23, 2017, which is hereby incorporated by reference herein in its entirety.

What is claimed is:

1. An image forming apparatus including a forming unit, the image forming apparatus comprising:
at least one memory device that stores a set of instructions; and
at least one processor that executes the instructions stored in the at least one memory device to function as:
a first obtaining unit that obtains a type of a sheet;
a second obtaining unit that obtains an image;
a selection unit that selects a screen from among screens including a first screen and a second screen based on the obtained type of the sheet, wherein a number of pixels representing a smallest halftone dot of the first screen is different from a number of pixels representing a smallest halftone dot of the second screen;
a generation unit that performs halftone processing on the image using the selected screen to generate a halftone image, wherein a number of the smallest halftone dots of the first screen in the halftone image increases when a density of the image increases and a number of the smallest halftone dots of the second screen in the halftone image increases when a density of the image increases; and
a control unit that controls the forming unit to form the generated halftone image on the sheet.

2. The image forming apparatus according to claim 1, wherein the at least one processor executes the instructions stored in the at least one memory device to further function as a registration unit that registers the number of pixels representing the smallest halftone dot of the screens and corresponding to the type of the sheet,
wherein the selection unit selects the screen with reference to contents registered by the registration unit and the type of the sheet obtained by the obtaining unit.

3. The image forming apparatus according to claim 1, wherein the type of the sheet is identified by at least one piece of information out of a grammage, a paper thickness, a density, resistivity, a surface roughness, smoothness, air permeance, a hue, whiteness level, and a degree of gloss of the sheet.

4. The image forming apparatus according to claim 1, wherein the selection unit refers to corresponding information for specifying the number of pixels representing the smallest halftone dot of the screens based on the type of the sheet and a color of a color material to be used in forming of the halftone image, and selects the screen corresponding to the specified number of pixels representing the smallest halftone dot using the corresponding information.

5. The image forming apparatus according to claim 1, wherein the first screen is selected based on the obtained type of the sheet being a first type and the second screen is selected based on the obtained type of the sheet being a second type.

6. The image forming apparatus according to claim 1, wherein the selection unit selects, for a plain paper, a screen having a smallest halftone dot that has a number of pixels smaller than a number of pixels representing a smallest halftone dot for a coat sheet.

7. The image forming apparatus according to claim 1, wherein the number of the smallest halftone dots of the first screen in the halftone image increases when a density of the image is below a predetermined density and increases, and the number of pixels representing the smallest halftone dot of the first screen increases when a density of the image is above the predetermined density and increases.

8. The image forming apparatus according to claim 1, wherein the number of the smallest halftone dots of the first screen in the halftone image increases while maintaining the number of pixels representing the smallest halftone dot when a density of the image is below a predetermined density and increases, and the number of the pixels representing the smallest halftone dot increases while maintaining the number of the smallest halftone dots of the first screen when a density of the image is above the predetermined density and increases.

9. A method of controlling an image forming apparatus including a forming unit, the method comprising:
obtaining a type of a sheet;
obtaining an image;
selecting a screen from among screens including a first screen and a second screen based on the obtained type of the sheet, wherein a number of pixels representing a smallest halftone dot of the first screen is different from a number of pixels representing a smallest halftone dot of the second screen;
performing halftone processing on the image using the selected screen to generate a halftone image, wherein a number of the smallest halftone dots of the first screen in the halftone image increases when a density of the image increases and a number of the smallest halftone dots of the second screen in the halftone image increases when a density of the image increases; and
controlling the forming unit to form the generated halftone image on the sheet.

10. The method according to claim 9, further comprising registering the number of pixels representing the smallest halftone dot of the screens and corresponding to the type of the sheet,
wherein, in the selecting, the screen is selected with reference to contents registered in the registering and the obtained type of the sheet.

11. The method according to claim 9, wherein the type of the sheet is identified by at least one piece of information out of a grammage, a paper thickness, a density, resistivity, a surface roughness, smoothness, air permeability, a hue, whiteness level, and a degree of gloss of the sheet.

12. The method according to claim 9, wherein the number of the smallest halftone dots of the first screen in the halftone image increases when a density of the image is below a predetermined density and increases, and the number of pixels representing the smallest halftone dot of the first screen increases when a density of the image is above the predetermined density and increases.

13. The method according to claim 9, wherein the number of the smallest halftone dots of the first screen in the halftone image increases while maintaining the number of pixels representing the smallest halftone dot when a density of the image is below a predetermined density and increases, and the number of pixels representing the smallest halftone dot increases while maintaining the number of the smallest halftone dots of the first screen when a density of the image is above the predetermined density and increases.

14. A non-transitory computer-readable storage medium storing a program for causing a processor to execute a method of controlling an image forming apparatus including a forming unit, the method comprising:
obtaining a type of a sheet;
obtaining an image;
selecting a screen from among screens including a first screen and a second screen based on the obtained type of the sheet, wherein a number of pixels representing a smallest halftone dot of the first screen is different from a number of pixels representing a smallest halftone dot of the second screen;
performing halftone processing on the image using the selected screen to generate a halftone image, wherein a number of the smallest halftone dots of the first screen in the halftone image increases when a density of the image increases and a number of the smallest halftone dots of the second screen in the halftone image increases when a density of the image increases; and
controlling the forming unit to form the generated halftone image on the sheet.

15. The non-transitory computer-readable storage medium according to claim 14, wherein the number of the smallest halftone dots of the first screen in the halftone image increases when a density of the image is below a predetermined density and increases, and the number of pixels representing the smallest halftone dot of the first screen increases when a density of the image is above the predetermined density and increases.

16. The non-transitory computer-readable storage medium according to claim 14, wherein the number of the smallest halftone dots of the first screen in the halftone image increases while maintaining the number of pixels representing the smallest halftone dot when the density of the image is below a predetermined density and increases, and the number of pixels representing the smallest halftone dot increases while maintaining the number of the smallest halftone dots of the first screen when the density of the image is above the predetermined density and increases.

* * * * *